(12) United States Patent
Freely et al.

(10) Patent No.: US 11,834,186 B2
(45) Date of Patent: Dec. 5, 2023

(54) AIRCRAFT EQUIPPED WITH A DISTRIBUTED PROPULSION SYSTEM HAVING SUCTION AND PRESSURE FANS

(71) Applicant: General Electric Company, Schenectady, NY (US)

(72) Inventors: Brendan Michael Freely, Loveland, OH (US); Kurt David Murrow, Springboro, OH (US); Michael James McMahon, Cincinnati, OH (US); Andrew Breeze-Stringfellow, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/006,965

(22) Filed: Aug. 31, 2020

(65) Prior Publication Data

US 2022/0063796 A1  Mar. 3, 2022

(51) Int. Cl.
*B64D 27/02* (2006.01)
*B64D 27/24* (2006.01)
(Continued)

(52) U.S. Cl.
CPC .............. *B64D 27/02* (2013.01); *B64C 23/00* (2013.01); *B64D 27/24* (2013.01); *B64D 31/12* (2013.01); *F04D 25/166* (2013.01)

(58) Field of Classification Search
CPC ......... B64C 27/24; B64C 15/00; B64C 15/12; B64D 27/02
See application file for complete search history.

(56) References Cited

U.S. PATENT DOCUMENTS 2,418,465 A * 4/1947 Doba, Jr. ................ G01S 13/60
342/158
2,858,533 A * 10/1958 Richmond ................ G01S 1/02
342/183
(Continued)

FOREIGN PATENT DOCUMENTS

DE       102016010216 A1 * 3/2018

OTHER PUBLICATIONS

Wikipedia, Air Data Inertial Reference Unit, 2019, [https://web.archive.org/web/20191229130604/https://en.wikipedia.org/wiki/Air_data_inertial_reference_unit] (Year: 2019).*

*Primary Examiner* — Philip J Bonzell
*Assistant Examiner* — Justin Michael Heston
(74) *Attorney, Agent, or Firm* — Dority & Manning, P.A.

(57) ABSTRACT

An aircraft equipped with a distributed fan propulsion system and methods of operating such aircraft are provided. In one aspect, an aircraft includes a wing having a top surface and a bottom surface. The aircraft also has a distributed propulsion system that includes a suction fan array having one or more fans mounted to the wing and a pressure fan array having one or more fans mounted to the wing. The fans of the suction fan array are each positioned primarily above the top surface of the wing and the fans of the pressure fan array are each positioned primarily below the bottom surface of the wing. The fans of the suction fan array are controllable independent of the fans of the pressure fan array so that the air pressure above and/or below the wing can be locally controlled, allowing for adjustment of lift on the wing.

15 Claims, 8 Drawing Sheets

(51) Int. Cl.
  *B64C 23/00* (2006.01)
  *B64D 31/12* (2006.01)
  *F04D 25/16* (2006.01)

(56) References Cited

U.S. PATENT DOCUMENTS

| | | |
|---|---|---|
| 4,912,921 A | 4/1990 | Rice et al. |
| 5,374,010 A | 12/1994 | Stone et al. |
| 5,687,561 A | 11/1997 | Newton |
| 6,467,725 B1 | 10/2002 | Coles et al. |
| 8,402,740 B2 | 3/2013 | Guemmer |
| 9,751,614 B1 | 9/2017 | Nguyen et al. |
| 10,518,863 B2 | 12/2019 | Moxon |
| 2011/0001001 A1 | 1/2011 | Bryant |
| 2012/0128493 A1 | 5/2012 | Shelley |
| 2014/0223884 A1* | 8/2014 | Sankrithi ................ F01D 7/00 60/204 |
| 2016/0236790 A1* | 8/2016 | Knapp .................... G01C 21/20 |
| 2016/0288903 A1* | 10/2016 | Rothhaar ................ B64C 9/04 |
| 2016/0355272 A1 | 12/2016 | Moxon |
| 2017/0211474 A1* | 7/2017 | Sennoun .................. F02C 7/00 |
| 2017/0297699 A1* | 10/2017 | Alber ..................... B64D 27/10 |
| 2018/0118356 A1 | 5/2018 | Armstrong et al. |
| 2018/0291807 A1 | 10/2018 | Dalal |
| 2019/0009920 A1* | 1/2019 | Armstrong ................ H02J 3/12 |
| 2020/0017212 A1 | 1/2020 | Easley et al. |

\* cited by examiner

AIRCRAFT EQUIPPED WITH A DISTRIBUTED PROPULSION SYSTEM HAVING SUCTION AND PRESSURE FANS

FIELD

The present subject matter relates generally to aircraft having distributed propulsion systems.

BACKGROUND

Aircraft can include various high-lift devices for controlling the lift thereof during flight. For instance, an aircraft can include slats, flaps, and/or other movable and/or fixed devices for increasing the lift of the aircraft. Such devices can be particularly useful during the takeoff and landing phases of flight. While such high-lift devices are effective at increasing the lift of an aircraft, such devices can add complexity and mass to the aircraft, which is undesirable. As one example, movable high-lift devices can be controlled hydraulically. Hydraulic systems positioned in part along the wings of an aircraft can be complex and add mass to the wings.

Accordingly, aircraft and methods of operating an aircraft that address one or more of the challenges noted above would be useful.

BRIEF DESCRIPTION

Aspects of the present disclosure are directed to distributed control systems and methods of controlling turbomachines. Aspects and advantages of the invention will be set forth in part in the following description, or may be obvious from the description, or may be learned through practice of the invention.

In one aspect, an aircraft is provided. The aircraft includes a wing having a top surface and a bottom surface. The aircraft also includes a suction fan array having one or more fans mounted to the wing. The one or more fans are each positioned primarily above the top surface of the wing. The aircraft further includes a pressure fan array having one or more fans mounted to the wing. The one or more fans of the pressure fan array are each positioned primarily below the bottom surface of the wing. The one or more fans of the suction fan array are controllable independent of the one or more fans of the pressure fan array.

In another aspect, a method is provided. The method includes operating an aircraft by rotating one or more fans of a suction fan array and one or more fans of a pressure fan array. The one or more fans of the suction fan array and the one or more fans of the pressure fan array are each mounted to a wing of the aircraft. The one or more fans of the suction fan array are positioned primarily above a top surface of the wing and the one or more fans of the pressure fan array are each positioned primarily below a bottom surface of the wing. Further, the method includes receiving, by one or more computing devices of the aircraft, a thrust demand and one or more parameter values for one or more parameters associated with the aircraft. The method also includes generating, by the one or more computing devices, a control command based at least in part on the thrust demand and the one or more parameter values. In addition, the method includes causing, by the one or more computing devices, one or more controllable devices of the aircraft to adjust at least one of a first operating point for the one or more fans of the suction fan array and a second operating point for the one or more fans of the pressure fan array based at least in part on the control command so that a pressure ratio of an air pressure below the bottom surface of the wing to an air pressure above the top surface of the wing is changed.

In a further aspect, a method of operating an aircraft is provided. The method includes rotating one or more fans of a suction fan array, the one or more fans of the suction fan array each being mounted to a wing of the aircraft and being positioned primarily above a top surface of the wing. Further, the method includes windmilling one or more fans of a pressure fan array, the one or more fans of the pressure fan array each being mounted to the wing of the aircraft and each being positioned primarily below a bottom surface of the wing, wherein in windmilling the one or more fans of the pressure fan array, the one or more fans of the pressure fan array are driven about their respective axes of rotation by incoming airflow so that one or more electric machines operatively coupled thereto output electrical power.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
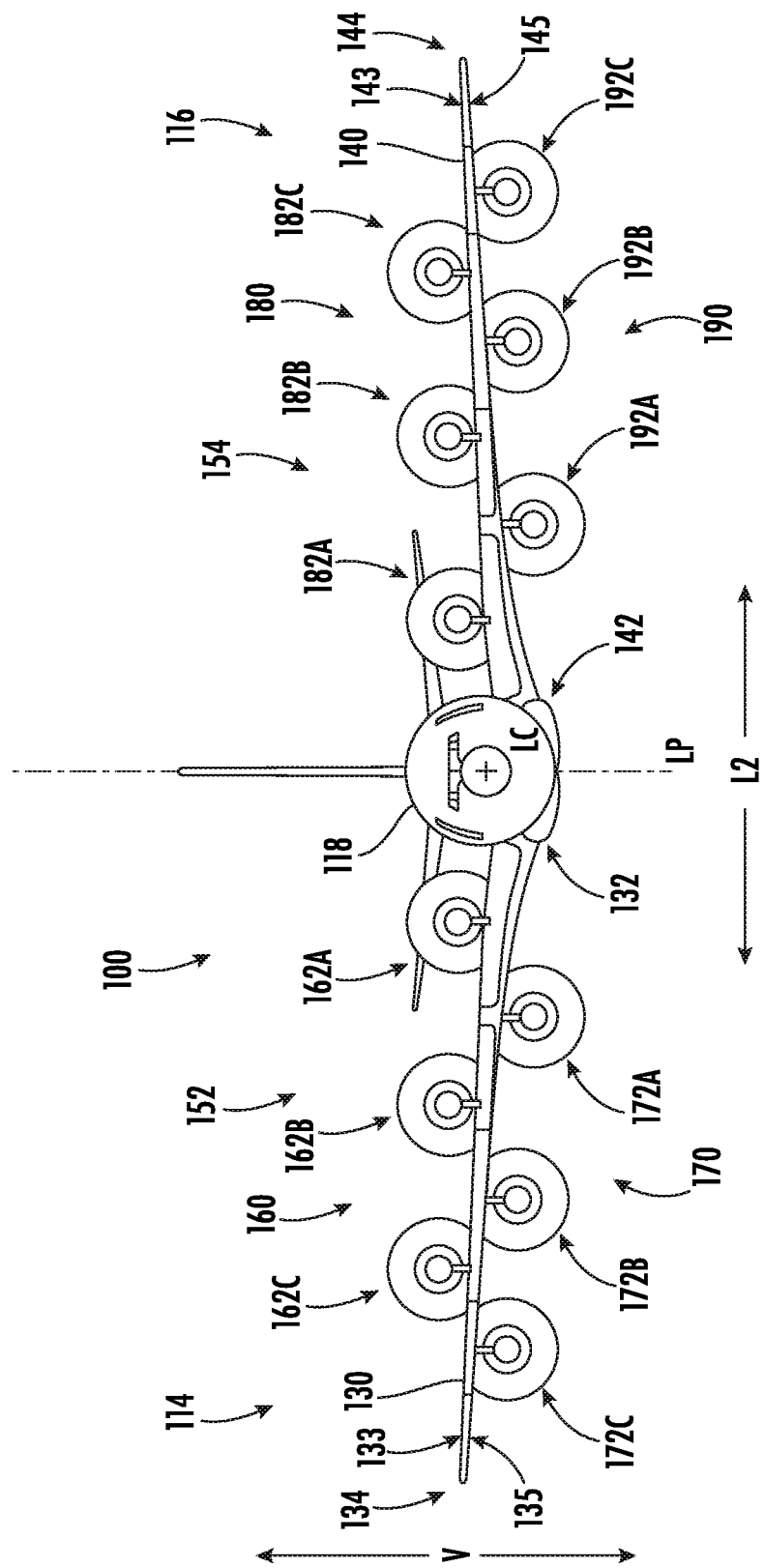
FIG. 1 provides a front view of an aircraft equipped with a distributed propulsion system according to an example embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Aspects of the present disclosure are directed to an aircraft having a fan propulsion system and methods of operating the same. In one aspect, an aircraft includes a wing having a top surface and a bottom surface. The aircraft also has a distributed propulsion system that includes a suction fan array having one or more fans mounted to the wing and a pressure fan array having one or more fans mounted to the wing. The fans of the suction fan array are each positioned primarily above the top surface of the wing and the fans of the pressure fan array are each positioned primarily below the bottom surface of the wing. The fans of the suction fan array are controllable independent of the fans of the pressure fan array so that the air pressure above and/or below the wing can be locally controlled, allowing for adjustment of lift on the wing.

Figure 2:
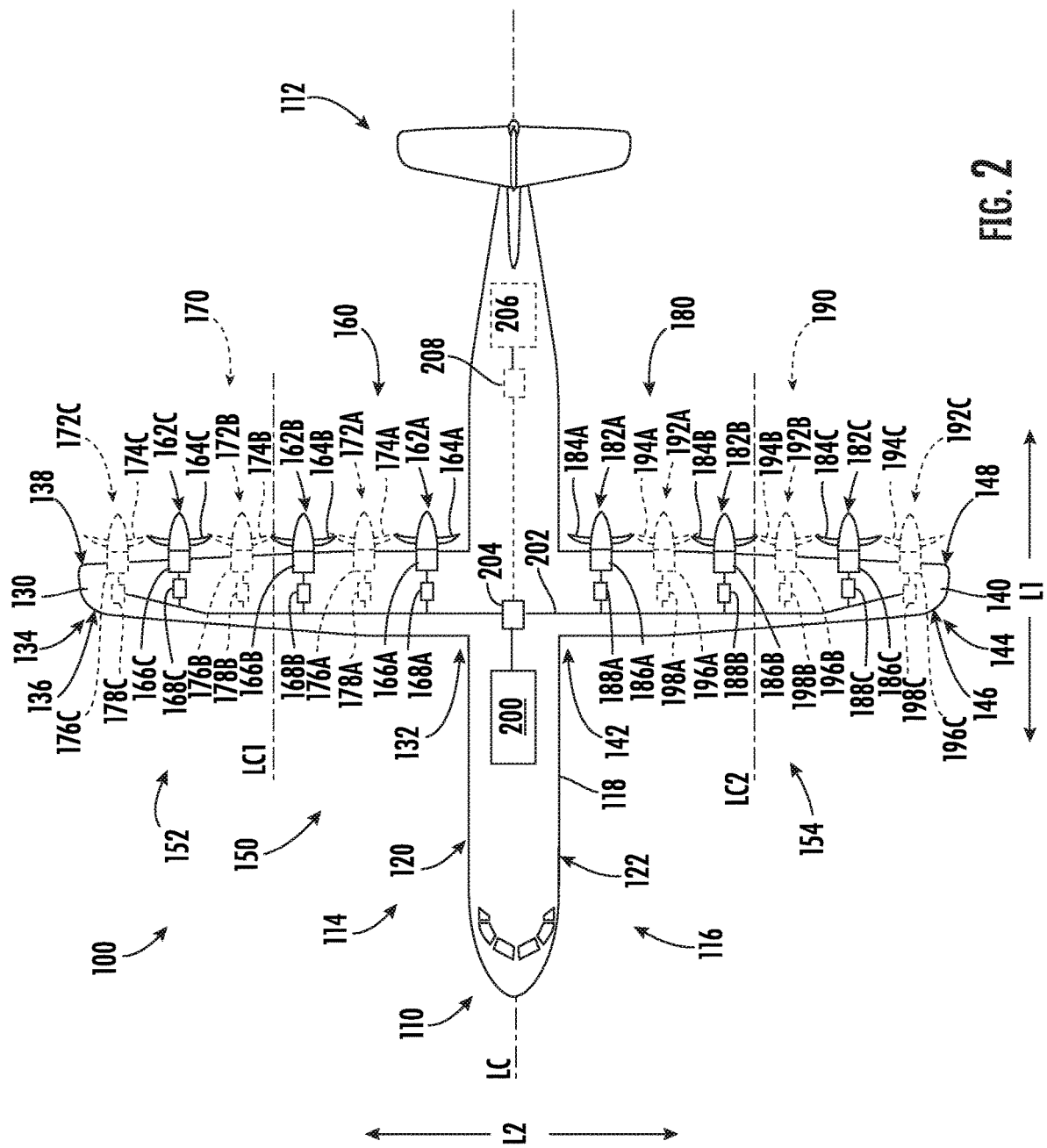
FIG. 2 provides a schematic top plan view of the aircraft of FIG. 1.

With reference now to FIGS. 1 and 2, FIG. 1 provides a front view of an aircraft 100 equipped with a distributed propulsion system 150 according to an example embodiment of the present disclosure. FIG. 2 provides a schematic top plan view of the aircraft 100. As shown, for this embodiment, the aircraft 100 of FIGS. 1 and 2 is a fixed-wing aircraft having a "tube and wing" configuration. However, the inventive aspects of the present disclosure may apply to other aircraft configurations as well, such as blended wing configurations and flying wing configurations. Further, the inventive aspects of the present disclosure can apply to both manned and unmanned aircraft, or Unmanned Aerial Vehicles (UAVs). For reference, the aircraft 100 defines a longitudinal direction L1, a lateral direction L2, and a vertical direction V extending orthogonal to one another to define an orthogonal direction system. The aircraft 100 also defines a lateral centerline LC that extends along the longitudinal direction L1 and separates the aircraft 100 into halves, e.g., a first side and a second side.

As shown, the aircraft 100 extends between a first end 110 and a second end 112, e.g., along the longitudinal direction L1. The first end 110 is a forward end of the aircraft 100 and the second end 112 is a rear or aft end of the aircraft 100 for this embodiment. As noted above, the lateral centerline LC separates the aircraft 100 into halves along the lateral direction L2, or stated another way, into a first side 114 and a second side 116. For instance, with reference specifically to FIG. 1, the first side 114 of the aircraft 100 encompasses everything to the left of the lateral centerline LC and the second side 116 of the aircraft 100 encompasses everything to the right of the lateral centerline LC. Accordingly, the aircraft 100 can define a lateral centerline plane LP that extends through the lateral centerline LC in a plane orthogonal to the lateral direction L2 as represented by the dash-dot line in FIG. 1. The first side 114 of the aircraft 100 encompasses everything to the left of the lateral centerline plane LP and the second side 116 of the aircraft 100 encompasses everything to the right of the lateral centerline plane LP.

For this embodiment, the aircraft 100 includes a fuselage 118 having a starboard side 120 and a port side 122. The aircraft 100 also includes a pair of wings 130, 140 each extending laterally outward from the fuselage 118. Particularly, a first wing 130 extends outward from the starboard side 120 of the fuselage 118, e.g., along the lateral direction L2. The first wing 130 spans between a wing root 132 and a wing tip 134. A spanwise length of the first wing 130 extends between the wing root 132 and the wing tip 134. The first wing 130 also has a leading edge 136 and a trailing edge 138. A chordwise length of the first wing 130 extends between the leading edge 136 and the trailing edge 138. The first wing 130 has a top surface 133 and a bottom surface 135. The top surface 133 and the bottom surface 135 are connected at the leading edge 136 and the trailing edge 138.

A second wing 140 extends outward from the port side 122 of the fuselage 118 opposite the first wing 130. The second wing 140 spans between a wing root 142 and a wing tip 144. A spanwise length of the second wing 140 extends between the wing root 142 and the wing tip 144. The second wing 140 also has a leading edge 146 and a trailing edge 148. A chordwise length of the second wing 140 extends between the leading edge 146 and the trailing edge 148. The second wing 140 has a top surface 143 and a bottom surface 145. The top surface 143 and the bottom surface 145 are connected at the leading edge 146 and the trailing edge 148.

The aircraft 100 further includes the distributed propulsion system 150. The distributed propulsion system 150 is operable to produce thrust for the aircraft 100, and in some instances, electrical power. As depicted, the distributed propulsion system 150 includes a plurality of propulsors or fans. For this embodiment, the fans are unducted fans. The unducted fans can be any suitable type of unducted fan, including, without limitation, propellers, open rotor fans, etc. In other embodiments, the fans can be ducted fans.

For the depicted aircraft 100 of FIGS. 1 and 2, the distributed propulsion system 150 includes a first set 152 of fans mounted to the first wing 130 and a second set 154 of fans mounted to the second wing 140. The first set 152 includes two layers of distributed fan arrays, including a first suction fan array 160 having one or more fans distributed along and mounted to the first wing 130 and a first pressure fan array 170 having one or more fans distributed along and mounted to the first wing 130. Similarly, the second set 154 includes two layers of distributed fan arrays, including a second suction fan array 180 having one or more fans distributed along and mounted to the second wing 140 and a second pressure fan array 190 having one or more fans distributed along and mounted to the second wing 140.

Specifically, for the first set 152, the first suction fan array 160 includes a plurality of fans 162A, 162B, 162C distributed spanwise along the first wing 130 and the first pressure fan array 170 includes a plurality of fans 172A, 172B, 172C distributed spanwise along the first wing 130 as well (the fans 172A, 172B, 172C are shown in phantom in FIG. 2). Each of the fans 162A, 162B, 162C of the first suction fan array 160 include a plurality of fan blades 164A, 164B, 164C rotatable about their respective axes of rotation and each of the fans 172A, 172B, 172C of the first pressure fan array 170 include a plurality of fan blades 174A, 174B, 174C rotatable about their respective axes of rotation (the fan blades 174A, 174B, 174C are shown in phantom in FIG. 2).

As depicted best in FIG. 1, the fans 162A, 162B, 162C of the first suction fan array 160 are mounted to the top surface 133 of the first wing 130 and the fans 172A, 172B, 172C of the first pressure fan array 170 are mounted to the bottom surface 135 of the first wing 130. In other embodiments, the fans 162A, 162B, 162C, 172A, 172B, 172C are all mounted to the top surface 133 of the first wing 130. In yet other embodiments, the fans 162A, 162B, 162C, 172A, 172B, 172C are all mounted to the bottom surface 135 of the first wing 130. Regardless of the mounting configuration of the fans 162A, 162B, 162C, 172A, 172B, 172C, notably, each of the fans 162A, 162B, 162C of the first suction fan array 160 are positioned primarily above the top surface 133 of the first wing 130, e.g., along the vertical direction V, and each of the fans 172A, 172B, 172C of the first pressure fan array 170 are positioned primarily below the bottom surface 135 of the first wing 130, e.g., along the vertical direction V. As used herein, "primarily" means that a disk defined by a given fan is positioned 50% or more above or below the stated surface along the vertical direction V. The disk associated with a fan is an area that is swept out by the fan during operation.

Figure 3:
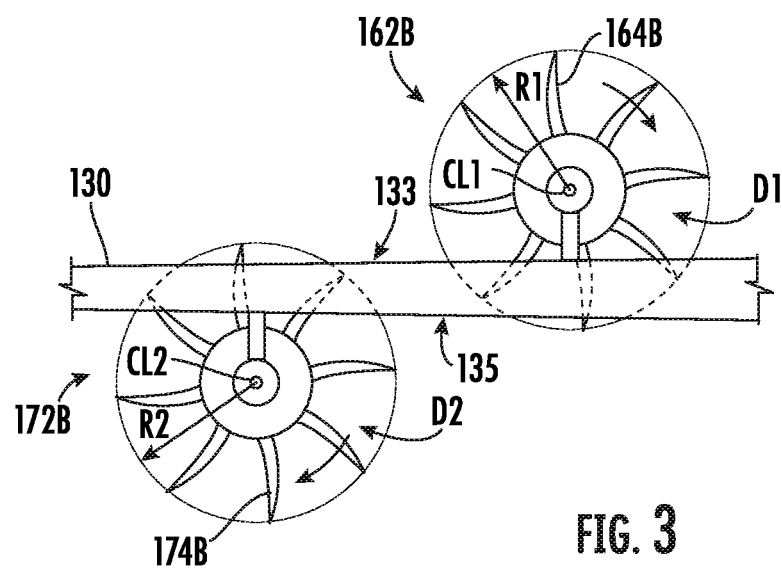
FIG. 3 provides a close-up schematic view of a pair of fans of the distributed propulsion system of the aircraft of FIG. 1.

By way of example, FIG. 3 provides a close-up schematic view of one fan 162B of the first suction fan array 160 and one fan 172B of the first pressure fan array 170. The fan 162B of the first suction fan array 160 defines a radius R1 extending from its fan centerline CL1 to the tip of one of its fan blades 164B. A disk D1 of the fan 162B is defined as $A=\pi R1^2$. Accordingly, as shown, the fan 162B is positioned primarily above the above the top surface 133 of the first wing 130 as at least 50% of the disk D1 is positioned above the top surface 133 of the first wing 130. Similarly, the fan 172B of the first pressure fan array 170 defines a radius R2 extending from its fan centerline CL2 to the tip of one of its fan blades 174B. A disk D2 of the fan 172B is defined as $A=\pi R2^2$. Accordingly, as shown, the fan 172B is positioned primarily below the bottom surface 135 of the first wing 130 as at least 50% of the disk D2 is positioned below the bottom surface 135 of the first wing 130. It will be appreciated that the disk of the other fans of the distributed propulsion system 150 can be calculated in a similar manner.

Returning to FIGS. 1 and 2, for the second set 154, the second suction fan array 180 includes a plurality of fans 182A, 182B, 182C distributed spanwise along the second wing 140 and the second pressure fan array 190 includes a plurality of fans 192A, 192B, 192C distributed spanwise along the second wing 140 as well (the fans 192A, 192B, 192C are shown in phantom in FIG. 2). Each of the fans 182A, 182B, 182C of the second suction fan array 180 include a plurality of fan blades 184A, 184B, 184C rotatable about their respective axes of rotation and each of the fans 192A, 192B, 192C of the second pressure fan array 190 include a plurality of fan blades 194A, 194B, 194C rotatable about their respective axes of rotation (the fan blades 194A, 194B, 194C are shown in phantom in FIG. 2).

As depicted best in FIG. 1, the fans 182A, 182B, 182C of the second suction fan array 180 are mounted to the top surface 143 of the second wing 140 and the fans 192A, 192B, 192C of the second pressure fan array 190 are mounted to the bottom surface 145 of the second wing 140. In other embodiments, the fans 182A, 182B, 182C, 192A, 192B, 192C are all mounted to the top surface 143 of the second wing 140. In yet other embodiments, the fans 182A, 182B, 182C, 192A, 192B, 192C are all mounted to the bottom surface 145 of the second wing 140. Regardless of the mounting configuration of the fans 182A, 182B, 182C, 192A, 192B, 192C, notably, each of the fans 182A, 182B, 182C of the second suction fan array 180 are positioned primarily above the top surface 143 of the second wing 140, e.g., along the vertical direction V, and each of the fans 192A, 192B, 192C of the second pressure fan array 190 are positioned primarily below the bottom surface 145 of the second wing 140, e.g., along the vertical direction V.

While the first set 152 and the second set 154 of fans are each shown having three fans primarily above and primarily below their respective wings 130, 140, it will be appreciated that in other embodiments the aircraft 100 can have more or less fans distributed along its wings 130, 140. For instance, in some embodiments, the first set 152 of the aircraft 100 can have a single fan above the top surface 133 and a single fan below the bottom surface 135 of the first wing 130 and the second set 154 can have a single fan above the top surface 143 and a single fan below the bottom surface 145 of the second wing 140.

For the depicted embodiment of FIGS. 1 and 2, the fan blades 164A, 164B, 164C of the fans 162A, 162B, 162C of the first suction fan array 160 and the fan blades 174A, 174B, 174C of the fans 172A, 172B, 172C of the first pressure fan array 170 are each positioned aft of the trailing edge 138 of the first wing 130. Similarly, the fan blades 184A, 184B, 184C of the fans 182A, 182B, 182C of the second suction fan array 180 and the fan blades 194A, 194B, 194C of the fans 192A, 192B, 192C of the second pressure fan array 190 are each positioned aft of the trailing edge 148 of the second wing 140.

Figure 4:
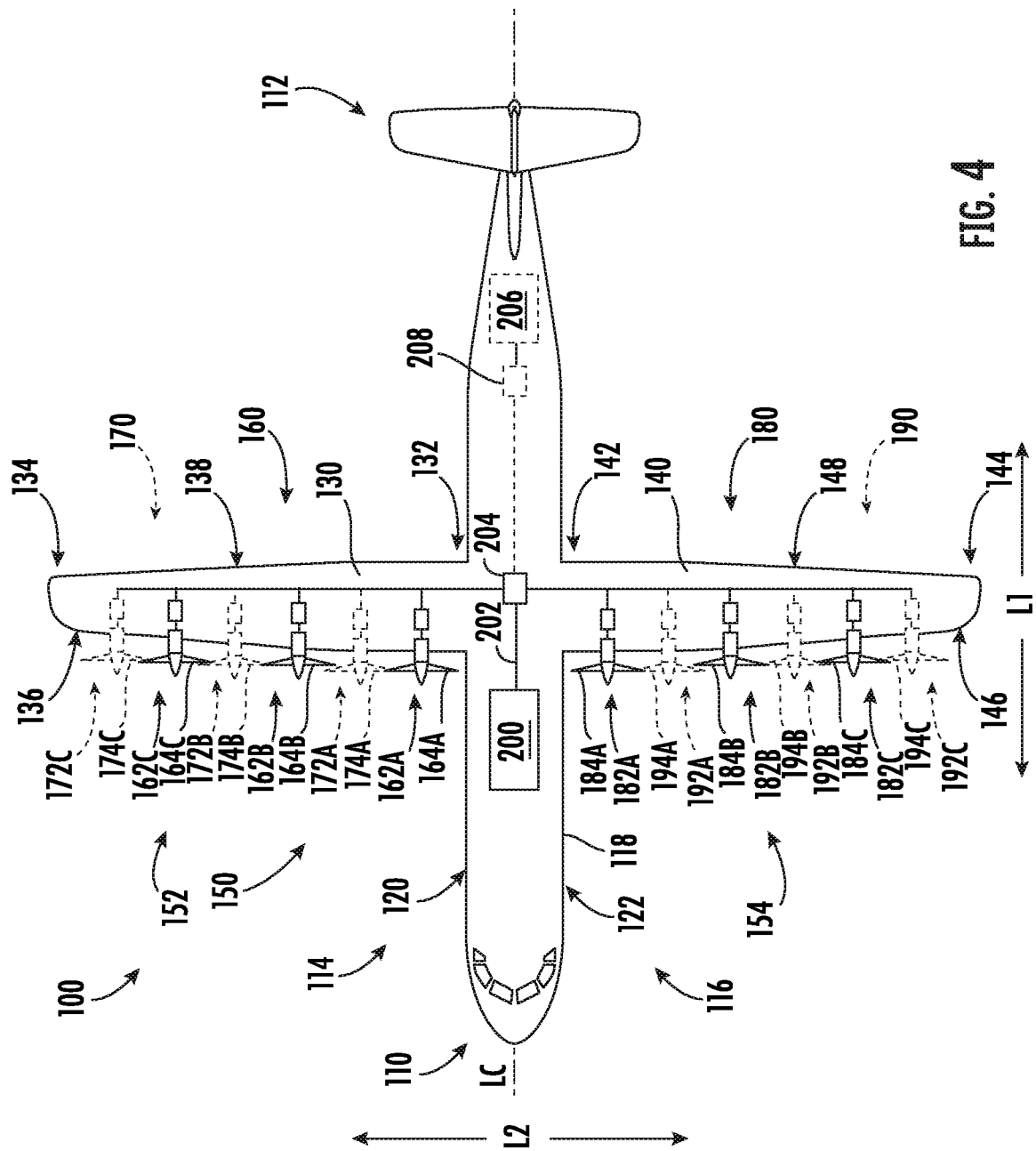
FIG. 4 provides a schematic top plan view of an aircraft equipped with a distributed fan propulsion system according to another example embodiment of the present disclosure.

In other embodiments, as shown in FIG. 4, the fan blades 164A, 164B, 164C of the fans 162A, 162B, 162C of the first suction fan array 160 and the fan blades 174A, 174B, 174C of the fans 172A, 172B, 172C of the first pressure fan array 170 can each be positioned forward of the leading edge 136 of the first wing 130. In a similar manner, the fan blades 184A, 184B, 184C of the fans 182A, 182B, 182C of the second suction fan array 180 and the fan blades 194A, 194B, 194C of the fans 192A, 192B, 192C of the second pressure fan array 190 can each be positioned forward of the leading edge 136 of the second wing 140. In such embodiments, the fans can be propeller assemblies, for example.

Returning to FIGS. 1 and 2, in some embodiments, the fans 162A, 162B, 162C of the first suction fan array 160 and the fans 172A, 172B, 172C of the first pressure fan array 170 can be evenly distributed spanwise along the first wing 130 and/or the fans 182A, 182B, 182C of the second suction fan array 180 and the fans 192A, 192B, 192C of the second pressure fan array 190 can be evenly distributed spanwise along the second wing 140. In alternative embodiments, the fans 162A, 162B, 162C of the first suction fan array 160 and the fans 172A, 172B, 172C of the first pressure fan array 170 can be unevenly distributed spanwise along the first wing 130 and/or the fans 182A, 182B, 182C of the second suction fan array 180 and the fans 192A, 192B, 192C of the second pressure fan array 190 can be unevenly distributed spanwise along the second wing 140.

Further, in some embodiments, at least one of the fans 162A, 162B, 162C of the first suction fan array 160 and at least one of the fans 172A, 172B, 172C of the first pressure fan array 170 are positioned further toward the wing root 132 than the wing tip 134 of the first wing 130 and at least one of the fans 162A, 162B, 162C of the first suction fan array 160 and at least one of the fans 172A, 172B, 172C of the first pressure fan array 170 are positioned further toward the wing tip 134 than the wing root 132 of the first wing 130. For instance, as shown best in FIG. 2, the first wing 130 can define a first wing lateral centerline LC1. As shown, at least fans 162A and 172A are positioned further toward the wing root 132 than the wing tip 134 of the first wing 130 as they are on the wing root side of the first wing lateral centerline LC1. Moreover, at least fans 162C and 172C are positioned further toward the wing tip 134 than the wing root 132 of the first wing 130 as they are on the wing tip side of the first wing lateral centerline LC1.

In a similar manner, additionally or alternatively, at least one of the fans 182A, 182B, 182C of the second suction fan array 180 and at least one of the fans 192A, 192B, 192C of the second pressure fan array 190 are positioned further toward the wing root 132 than the wing tip 134 of the second wing 140 and at least one of the fans 182A, 182B, 182C of the second suction fan array 180 and at least one of the fans 192A, 192B, 192C of the second pressure fan array 190 are positioned further toward the wing tip 134 than the wing root 132 of the second wing 140. For instance, as shown best in FIG. 2, the second wing 140 can define a second wing lateral centerline LC2. As shown, at least fans 182A and 192A are positioned further toward the wing root 132 than the wing tip 134 of the second wing 140 as they are on the wing root side of the second wing lateral centerline LC2. Moreover, at least fans 182C and 192C are positioned further toward the wing tip 134 than the wing root 132 of the second wing 140 as they are on the wing tip side of the second wing lateral centerline LC2.

As further shown in FIGS. 1 and 2, the distributed propulsion system 150 includes at least one fan drive unit operable to drive one or more of the fan blades 164A, 164B, 164C of the fans 162A, 162B, 162C and/or the fan blades 174A, 174B, 174C of the fans 172A, 172B, 172C and/or the fan blades 184A, 184B, 184C of the fans 182A, 182B, 182C, and/or the fan blades 194A, 194B, 194C of the fans 192A, 192B, 192C. For instance, in some embodiments, the distributed propulsion system 150 can include a first fan drive unit for driving the fan blades 164A, 164B, 164C, 174A, 174B, 174C of the fans 162A, 162B, 162C, 172A, 172B, 172C and a second fan drive unit for driving the fan blades 184A, 184B, 184C, 194A, 194B, 194C of the fans 182A, 182B, 182C, 192A, 192B, 192C. The first and second fan drive units can both be electric machines operable in a drive mode for driving their respective fans. In yet other embodiments, the distributed propulsion system 150 can include a first fan drive unit for driving the fan blades 164A, 164B, 164C of the fans 162A, 162B, 162C, a second fan drive unit for driving the fan blades 174A, 174B, 174C of the fans 172A, 172B, 172C, a third fan drive unit for driving the fan blades 184A, 184B, 184C of the fans 182A, 182B, 182C, and a fourth fan drive unit for driving the fan blades 194A, 194B, 194C of the fans 192A, 192B, 192C. The first, second, third, and fourth fan drive units can be electric machines operable in a drive mode for driving their respective fans.

For this embodiment, the fans 162A, 162B, 162C of the first suction fan array 160 each have an associated fan drive unit 166A, 166B, 166C operatively coupled thereto, the fans 172A, 172B, 172C of the first pressure fan array 170 each have an associated fan drive unit 176A, 176B, 176C operatively coupled thereto (the fan drive units 176A, 176B, 176C are shown in phantom in FIG. 2), the fans 182A, 182B, 182C of the second suction fan array 180 each have an associated fan drive unit 186A, 186B, 186C operatively coupled thereto, and the fans 192A, 192B, 192C of the second pressure fan array 190 each have an associated fan drive unit 196A, 196B, 196C operatively coupled thereto (the fan drive units 196A, 196B, 196C are shown in phantom in FIG. 2). The fan drive units are operable to drive the fan blades of their respective fans. In such embodiments, the fan drive units 166A-C, 176A-C, 186A-C, 196A-C can be electric machines each operable in a drive mode for driving their associated fans. The electric machines can be electric motors or combination motor/generators, for example. The distributed propulsion system 150 can have other suitable configurations and number of fan drive units in other example embodiments.

For the depicted embodiment of FIGS. 1 and 2, the distributed propulsion system 150 of the aircraft 100 is an electric distributed fan propulsion system and includes one or more electrical power sources, power conditioning devices, transmission lines, etc. for providing electrical power to the fan drive units 166A-C, 176A-C, 186A-C, 196A-C. For instance, as shown best in FIG. 2, the aircraft 100 includes an electrical power source 200. The electrical power source 200 can be one or more energy storage devices, for example. The one or more energy storage devices can include one or more batteries, battery packs, super capacitors, etc. The electrical power source 200 can be mounted within the fuselage 118 or in another suitable location. Electrical power can be transmitted from the electrical power source 200 to various electrical power-consuming loads, such as the fan drive units 166A-C, 176A-C, 186A-C, 196A-C embodied as electric machines. A power bus 202 can carry the electrical power from the electrical power source 200 to the power-consuming loads. The power bus 202 can include one or more transmission lines or cables, switches, as well as other electrical components.

A plurality of power conditioning devices can be positioned along the power bus 202. For instance, for this embodiment, a first power converter 204 can be positioned along the power bus 202. The first power converter 204 can be a DC-DC power converter operable to change a voltage of the electrical power provided by the electrical power source 200. The electrical power conditioned by the first power converter 204 can be provided as Direct Current (DC) along the power bus 202 to a plurality of converters. For this embodiment, each fan drive unit 166A-C, 176A-C, 186A-C, 196A-C has an associated power converter 168A-C, 178A-C, 188A-C, 198A-C (the power converters 178A, 178B, 178C and 198A, 198B, 198C are shown in phantom lines in FIG. 2). The power converters 168A-C, 178A-C, 188A-C, 198A-C can convert the incoming DC current to Alternating Current (AC). Accordingly, the power converters 168A-C, 178A-C, 188A-C, 198A-C can be DC-AC power converters. The AC current can be provided to the fan drive units 166A-C, 176A-C, 186A-C, 196A-C embodied as electric machines. It will be appreciated that the configuration of the electric distributed unducted fan propulsion system provided in FIG. 2 is provided by way of example and is not intended to be limiting. Other suitable configurations for providing electrical power to the fan drive units 166A-C, 176A-C, 186A-C, 196A-C are possible.

In some embodiments, the distributed propulsion system 150 of the aircraft 100 can be a hybrid electric distributed fan propulsion system. In such embodiments, for example, the distributed propulsion system 150 can include a mechanical power source, such as a gas turbine engine 206. The gas turbine engine 206 can be operatively coupled with an electric machine 208. The electric machine 208 is operable in a generating mode. In this manner, the electric machine 208 can output electrical power. The electrical power output by the electric machine 208 can be provided to the electrical power source 200 and/or to the fan drive units 166A-C, 176A-C, 186A-C, 196A-C for driving their respective fans 162A-C, 172A-C, 182A-C, 192A-C.

Notably, in accordance with the inventive aspects of the present disclosure, the fans positioned primarily above the wings and the fans positioned primarily below the wings are separately-controllable arrays. In this manner, the suction and pressure fan arrays, or stated differently, the top and bottom arrays, can be independently controlled at different respective operating points to optimize different flight segments. Particularly, the top suction fans can be controlled to a first operating point (e.g., a first fan speed) and the bottom pressure fans can be controlled to a second operating point (e.g., a second fan speed) to ultimately optimize the lift on the wings.

For instance, during a flight segment where additional lift is desirable, e.g., during a takeoff, climb, descent, or approach segment of flight, the top suction fans can be controlled to a first operating point or fan speed such that an airflow streamline above the wings is increased, which decreases the pressure locally above the wing. This can increase the lift on the wing. Additionally or alternatively, the bottom suction fans can be controlled to a second operating point or fan speed such that an airflow streamline below the wings is decreased, which increases the pressure locally below the wing. This can increase the lift on the wing. Moreover, during a flight segment where less lift is needed, e.g., during a cruise segment or phase, the top suction fans can be controlled to a first operating point or fan speed such that an airflow streamline above the wings is decreased, which increases the pressure locally above the wing. This can decrease the lift on the wing. Additionally or alternatively, the bottom suction fans can be controlled to a second operating point or fan speed such that an airflow streamline below the wings is increased, which decreases the pressure locally below the wing. This can decrease the lift on the wing. An example manner in which the suction and pressure fans can be controlled to different operating points is provided below.

Figure 5:
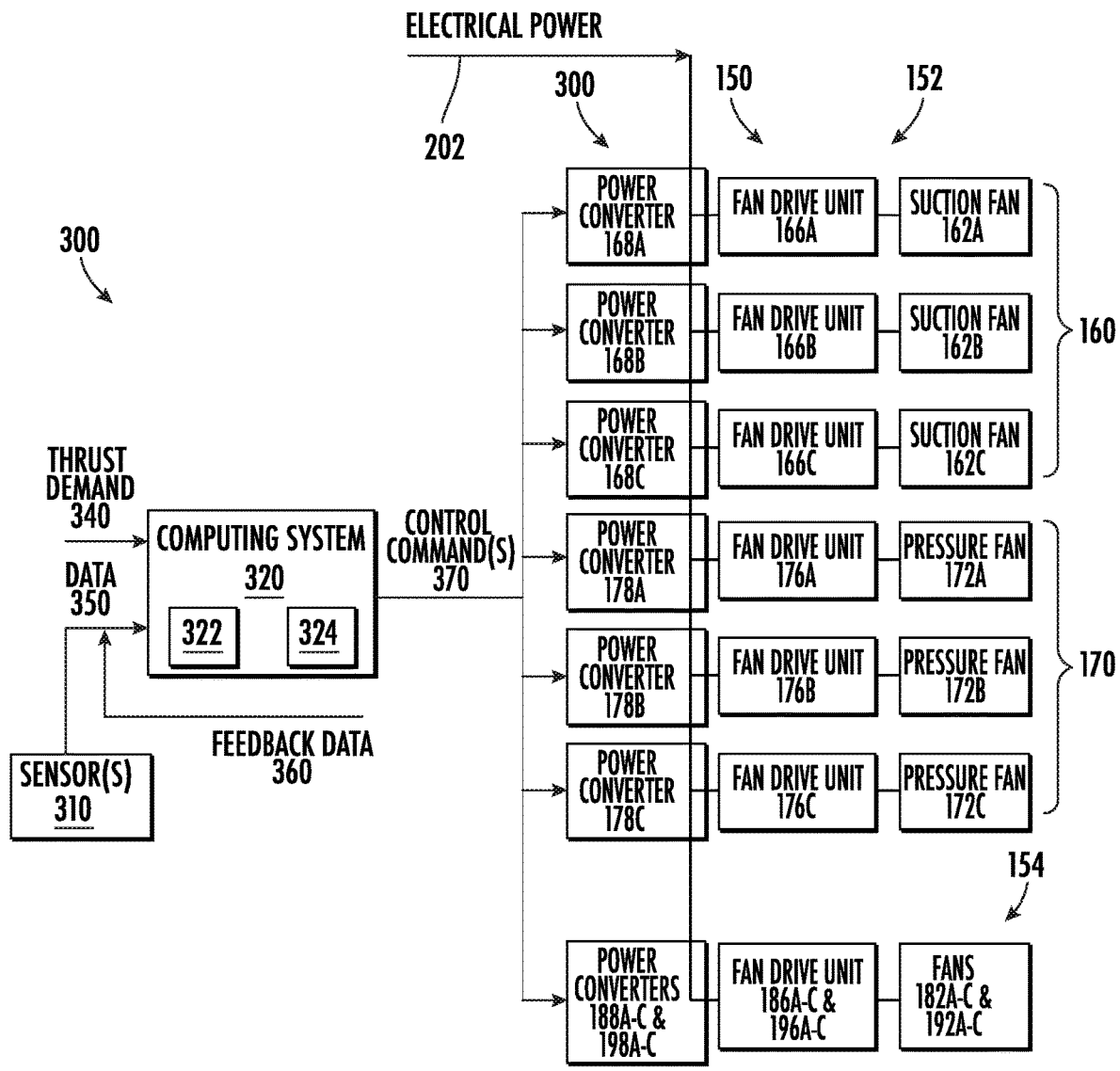
FIG. 5 provides a block diagram of an example control system for the distributed propulsion system of the aircraft of FIG. 1.

With reference now to FIGS. 1, 2 and 5, FIG. 5 provides a block diagram of a control system 300 for the distributed propulsion system 150 according to an example embodiment of the present disclosure. The control system 300 includes one or more sensors 310, a computing system 320 having one or more memory devices 322 and one or more processors 324, and one or more controllable devices 330, which in this embodiment are the power converters associated with their respective fan drive units, which are in turn associated with their respective fans. The computing system 320 is communicatively coupled with the controllable devices 330 and the sensors 310, e.g., via one or more wired and/or wireless communication links. The one or more memory devices 322 and one or more processors 324 can be embodied in one or more computing devices, for example.

As shown, the one or more processors 324 of the computing system 320 are configured to receive a thrust demand 340. The thrust demand 340 is a request or demand for a specific thrust output of the distributed propulsion system 150. As one example, a thrust demand signal can be routed from a cockpit of the aircraft 100 to the one or more processors 324 of the computing system 320. As another example, a thrust demand signal can be transmitted to the aircraft 100 from a remote pilot station and routed to the one or more processors 324 of the computing system 320. As will be explained further below, the thrust demand 340 can be utilized to adjust the operating point of the fans of the suction fan array and/or the fans of the pressure fan array.

Further, the one or more processors 324 of the computing system 320 are configured to receive data 350. At least a portion of the data 350 can be received from the sensors 310. The data 350 can include one or more sensed values for one or more parameters associated with the aircraft 100. The one or more processors 324 of the computing system 320 can receive the one or more sensed values for one or more parameters and can calculate additional parameters. In addition to the received thrust demand 340, one or more sensed and/or calculated parameter values for one or more parameters associated with the aircraft 100 can be utilized to adjust the operating point of the fans of the suction fan array and/or the fans of the pressure fan array. In some embodiments, the one or more parameters include at least one of an altitude, a change in altitude, an attitude of the aircraft, an ambient pressure, and an airspeed (e.g., a true airspeed of the aircraft).

In addition, in some embodiments, at least a portion of the data 350 can include feedback data 360 received from one or more components of the distributed propulsion system 150. For instance, the feedback data 360 can include one or more sensed values for one or more parameters associated with one or more of the power converters and/or one or more of the fan drive units and/or one or more of the fans. For instance, in some embodiments, the one or more parameters can include at least one of an electric current at one or more of the power converters and/or one or more of the fan drive units, a voltage at one or more of the power converters and/or one or more of the fan drive units, a shaft speed of one or more of the fan drive units, a fan speed of one or more of the fans, etc.

The one or more processors 324 of the computing system 320 are further configured to generate one or more control commands 370 based at least in part on the received thrust demand 340 and the data 350, and more specifically, the one or more parameter values for one or more parameters associated with the aircraft 100. The one or more control commands 370 indicating or providing instructions for adjusting at least one of the first operating point for the fans 162A, 162B, 162C of the first suction fan array 160 and the second operating point for the fans 172A, 172B, 172C of the first pressure fan array 170.

The one or more processors 324 of the computing system 320 are also configured to cause the one or more controllable devices to adjust at least one of the first operating point and the second operating point based at least in part on the generated one or more control commands 370. In some instance, only the first operating point for the fans 162A, 162B, 162C of the first suction fan array 160 is adjusted. In some instances, only the second operating point for the fans 172A, 172B, 172C of the first pressure fan array 170 is adjusted. In other instances, both the first operating point for the fans 162A, 162B, 162C of the first suction fan array 160 and the second operating point for the fans 172A, 172B, 172C of the first pressure fan array 170 is adjusted.

Notably, in causing the one or more controllable devices 330 to adjust at least one of the first operating set point and the second operating set point based at least in part on the one or more control commands 370, at least one of the first operating point and the second operating point is adjusted such that a pressure ratio of an air pressure below the wing to an air pressure above the top surface is changed. Stated mathematically, the pressure ratio can be defined as $P_B/P_A$, wherein $P_B$ is the local pressure of the air below a wing and $P_A$ is the local pressure of the air above the wing. As will be appreciated, a change in local pressure above and/or below a wing can change the lift on the wing. Accordingly, adjusting at least one of the first operating point (e.g., the fan speed) for the fans 162A, 162B, 162C of the first suction fan array 160 and/or the second operating point for the fans 172A, 172B, 172C of the first pressure fan array 170 changes the lift on the first wing 130 (FIG. 1).

As noted above, during some flight segments, additional lift on the wings of the aircraft 100 may be desirable. The particular flight segment in which the aircraft 100 is operating can be determined or estimated by the computing system 320 based at least in part on various parameters, such as the altitude, change in altitude of the aircraft, airspeed, attitude of the aircraft, etc. In some instances, to increase the lift on a given wing, in causing the one or more controllable devices 330 to adjust at least one of the first operating set point and the second operating set point based at least in part on the one or more control commands 370, at least one of the first operating point and the second operating point is adjusted such that the pressure ratio is increased. In this way, lift on the wing is increased.

As one example, the first operating point can be adjusted such that a velocity of an airflow streamline above the top surface 133 of the first wing 130 is increased. This decreases the pressure above the wing, or stated differently, $P_A$ is decreased. Accordingly, the pressure ratio is increased and the lift on the wing is increased. For instance, the first operating point or fan speed for the fans 162A, 162B, 162C of the first suction fan array 160 can be increased. Particularly, the power converters 168A, 168B, 168C can control the electrical power provided to their associated fan drive units 166A, 166B, 166C so that the fan drive units 166A, 166B, 166C increase their respective mechanical outputs. The increased mechanical outputs increase the fan speed of the fans 162A, 162B, 162C, which as noted above, increases the velocity of the airflow streamline above the top surface 133 of the first wing 130 thereby decreasing the local pressure above the first wing 130. The second operating point or fan speed for the fans 172A, 172B, 172C of the first pressure fan array 170 can be maintained or held constant. This effectively increases the lift on the first wing 130. Accordingly, additional lift on the first wing 130 can be provided due to the local control of the airspeed above the top surface 133, which is achievable due to the one or more fans 162A, 162B, 162C of the first suction fan array 160 being controllable to a first operating point that is different than the second operating point to which the one or more fans 172A, 172B, 172C of the first pressure fan array 170 are controlled.

As another example, the second operating point can be adjusted such that a velocity of an airflow streamline below the bottom surface 135 of the first wing 130 is decreased. This increases the pressure below the wing, or stated differently, $P_B$ is increased. Accordingly, the pressure ratio is increased and the lift on the wing is increased. For instance, the second operating point or fan speed for the fans 172A, 172B, 172C of the first pressure fan array 170 can be decreased. Particularly, the power converters 178A, 178B, 178C can control the electrical power provided to their associated fan drive units 176A, 176B, 176C so that the fan drive units 176A, 176B, 176C decrease their respective mechanical outputs. The decreased mechanical outputs decrease the fan speed of the fans 172A, 172B, 172C, which as noted above, decreases the velocity of the airflow streamline below the bottom surface 135 of the first wing 130 thereby increasing the local pressure below the first wing 130. The first operating point or fan speed for the fans 162A, 162B, 162C of the first suction fan array 160 can be maintained or held constant. This effectively increases the lift on the first wing 130. Accordingly, additional lift on the first wing 130 can be provided due to the local control of the airspeed below the bottom surface 135, which is achievable due to the one or more fans 172A, 172B, 172C of the first pressure fan array 170 being controllable to a second operating point that is different than the first operating point to which the one or more fans 162A, 162B, 162C of the first suction fan array 160 are controlled.

As yet another example, the first operating point can be adjusted such that a velocity of an airflow streamline above the top surface 133 of the first wing 130 is increased and the second operating point can be adjusted such that a velocity of an airflow streamline below the bottom surface 135 of the first wing 130 is decreased. This decreases the pressure above the wing and increases the pressure below the wing. Stated another way, $P_A$ is decreased while $P_B$ is increased. Accordingly, the pressure ratio is increased and the lift on the wing is increased.

As a further example, the first operating point can be adjusted such that a velocity of an airflow streamline above the top surface 133 of the first wing 130 is increased and the second operating point can be adjusted such that a velocity of an airflow streamline below the bottom surface 135 of the first wing 130 is increased, wherein the first operating point is adjusted such that the velocity of the airflow streamline above the top surface 133 of the first wing 130 is increased to a greater degree or percentage than the velocity of the airflow streamline below the bottom surface 135 of the first wing 130. In this manner, a demand for more thrust can be met whilst still increasing the lift on the first wing 130.

As yet another example, the first operating point can be adjusted such that a velocity of an airflow streamline above the top surface 133 of the first wing 130 is decreased and the second operating point can be adjusted such that a velocity of an airflow streamline below the bottom surface 135 of the first wing 130 is decreased, wherein the first operating point is adjusted such that the velocity of the airflow streamline above the top surface 133 of the first wing 130 is decreased to a lesser degree or percentage than the velocity of the airflow streamline below the bottom surface 135 of the first wing 130. In this manner, a demand for less thrust can be met whilst still increasing the lift on the first wing 130.

As provided above, during some flight segments, less lift on the wings of the aircraft 100 may be desirable, e.g., during a cruise segment of flight. Accordingly, it may be desirable to change the lift on the wings of the aircraft 100 during flight, e.g., when the aircraft 100 transitions from the climb segment to the cruise segment of a flight. The particular flight segment in which the aircraft 100 is operating can be determined or estimated by the computing system 320 based at least in part on various parameters received as part of the data 350 or derived therefrom, such as the altitude, change in altitude of the aircraft, airspeed, attitude of the aircraft, etc. To decrease the lift on a given wing, in causing the one or more controllable devices 330 to adjust at least one of the first operating set point and the second operating set point based at least in part on the one or more control commands 370, at least one of the first operating point and the second operating point is adjusted such that the pressure ratio is decreased. In this way, lift on the wing is decreased.

As one example, the first operating point can be adjusted such that a velocity of an airflow streamline above the top surface 133 of the first wing 130 is decreased. This increases the pressure above the wing, or stated differently, $P_A$ is increased. Accordingly, the pressure ratio is decreased and the lift on the wing is consequently decreased. For instance, the first operating point or fan speed for the fans 162A, 162B, 162C of the first suction fan array 160 can be decreased. Particularly, the power converters 168A, 168B, 168C can control the electrical power provided to their associated fan drive units 166A, 166B, 166C so that the fan drive units 166A, 166B, 166C decrease their respective mechanical outputs. The decreased mechanical outputs decrease the fan speed of the fans 162A, 162B, 162C, which as noted above, decreases the velocity of the airflow streamline above the top surface 133 of the first wing 130 thereby increasing the local pressure above the first wing 130. The second operating point or fan speed for the fans 172A, 172B, 172C of the first pressure fan array 170 can be maintained or held constant. This effectively decreases the lift on the first wing 130. Accordingly, less lift on the first wing 130 can be provided due to the local control of the airspeed above the top surface 133, which is achievable due to the one or more fans 162A, 162B, 162C of the first suction fan array 160 being controllable to a first operating point that is different than the second operating point to which the one or more fans 172A, 172B, 172C of the first pressure fan array 170 are controlled.

As another example, the second operating point can be adjusted such that a velocity of an airflow streamline below the bottom surface 135 of the first wing 130 is increased. This decreases the pressure below the wing, or stated differently, $P_B$ is decreased. Accordingly, the pressure ratio is decreased and the lift on the wing is decreased. For instance, the second operating point or fan speed for the fans 172A, 172B, 172C of the first pressure fan array 170 can be increased. Particularly, the power converters 178A, 178B, 178C can control the electrical power provided to their associated fan drive units 176A, 176B, 176C so that the fan drive units 176A, 176B, 176C increase their respective mechanical outputs. The increased mechanical outputs increase the fan speed of the fans 172A, 172B, 172C, which as noted above, increases the velocity of the airflow streamline below the bottom surface 135 of the first wing 130 thereby decreasing the local pressure below the first wing 130. The first operating point or fan speed for the fans 162A, 162B, 162C of the first suction fan array 160 can be maintained or held constant. This effectively decreases the lift on the first wing 130. Accordingly, less lift on the first wing 130 can be provided due to the local control of the airspeed below the bottom surface 135, which is achievable due to the one or more fans 172A, 172B, 172C of the first pressure fan array 170 being controllable to a second operating point that is different than the first operating point to which the one or more fans 162A, 162B, 162C of the first suction fan array 160 are controlled.

As yet another example, the first operating point can be adjusted such that a velocity of an airflow streamline above the top surface 133 of the first wing 130 is decreased and the second operating point can be adjusted such that a velocity of an airflow streamline below the bottom surface 135 of the first wing 130 is increased. This increases the pressure above the wing and decreases the pressure below the wing. Stated another way, $P_A$ is increased while $P_B$ is decreased. Accordingly, the pressure ratio is decreased and the lift on the wing is decreased.

As a further example, the first operating point can be adjusted such that a velocity of an airflow streamline above the top surface 133 of the first wing 130 is increased and the second operating point can be adjusted such that a velocity of an airflow streamline below the bottom surface 135 of the first wing 130 is increased, wherein the first operating point is adjusted such that the velocity of the airflow streamline above the top surface 133 of the first wing 130 is increased to a lesser degree or percentage than the velocity of the airflow streamline below the bottom surface 135 of the first wing 130. In this manner, a demand for more thrust can be met whilst also decreasing the lift on the first wing 130.

As yet another example, the first operating point can be adjusted such that a velocity of an airflow streamline above the top surface 133 of the first wing 130 is decreased and the second operating point can be adjusted such that a velocity of an airflow streamline below the bottom surface 135 of the first wing 130 is decreased, wherein the first operating point is adjusted such that the velocity of the airflow streamline above the top surface 133 of the first wing 130 is decreased to a greater degree or percentage than the velocity of the airflow streamline below the bottom surface 135 of the first wing 130. In this manner, a demand for less thrust can be met whilst still decreasing the lift on the first wing 130.

With reference still to FIGS. 1, 2, and 5, as shown, the generated one or more control commands 370 can be routed to the controllable devices 330 (e.g., power converters 188A-C and 198A-C) associated with their respective fan drive units 186A-C and 196A-C, which are in turn associated their respective suction and pressure fans 182A-C and 192A-C of the second set 154 mounted to the second wing 140. This arrangement is shown schematically in FIG. 5. Notably, like the fans of the first set 152 mounted to the first wing 130, the suction and pressure fans 182A-C and 192A-C of the second set 154 can be controlled to different operating points, e.g., to control the lift on the second wing 140. Particularly, the one or more fans 182A-C of the second suction fan array 180 are controllable to a third operating point and the one or more fans 192A-C of the second pressure fan array 190 are controllable to a fourth operating point that is different than the third operating point.

In some embodiments, the third operating point is a same operating point as the first operating point and the fourth operating point is a same operating point as the second operating point. Accordingly, in such embodiments, the suction fans 162A-C of the first suction fan array 160 and the suction fans 182A-C of the second suction fan array 180 can be controlled synchronously to the same operating point or fan speed and the pressure fans 172A-C of the first pressure fan array 170 and the pressure fans 192A-C of the second pressure fan array 190 can be controlled synchronously to the same operating point or fan speed. This may allow for streamlined control of the fans and lift on the wings.

In yet other embodiments, the third operating point is a different operating point than the first operating point and the fourth operating point is a different operating point than the second operating point. Accordingly, in such embodiments, the suction fans 162A-C of the first suction fan array 160, the suction fans 182A-C of the second suction fan array 180, the pressure fans 172A-C of the first pressure fan array 170, and the pressure fans 192A-C of the second pressure fan array 190 can all be controlled independently of one another. This may allow for optimizing the lift on each wing in certain instances, e.g., during a landing in a heavy crosswind.

In some embodiments, control of the suction fans 162A-C of the first suction fan array 160 and the suction fans 182A-C of the second suction fan array 180 can be switched between being coupled and decoupled. Similarly, the control of the pressure fans 172A-C of the first pressure fan array 170 and the pressure fans 192A-C of the second pressure fan array 190 can be switched between being coupled and decoupled. As one example, control of the suction fans 162A-C of the first suction fan array 160 and the suction fans 182A-C of the second suction fan array 180 can be coupled as a default setting and can be switched to a decoupled control scheme based on certain flight conditions as determined by the received sensor data 350. For instance, if it is determined that the aircraft 100 is landing in heavy crosswind conditions, the one or more processors 324 can decouple control of the suction fans 162A-C of the first suction fan array 160 and the suction fans 182A-C of the second suction fan array 180. Similarly, control of the pressure fans 172A-C of the first pressure fan array 170 and the pressure fans 192A-C of the second pressure fan array 190 can be coupled as a default setting and can be switched to a decoupled control scheme based on certain flight conditions as determined by the received sensor data 350.

Furthermore, notably, the greater the number of fans distributed along a wing, the greater the localized control of the airflow streamlines above and/or below the wing. In some embodiments, at least three fans are positioned primarily above a top surface of a wing and at least three fans are positioned primarily below a bottom surface of the wing. For example, with reference to FIGS. 1 and 2, as shown, three suction fans 162A-C are positioned primarily above the top surface 133 of the first wing 130 and three pressure fans 172A-C are positioned primarily below the bottom surface 135 of the first wing 130. In addition, three suction fans 182A-C are positioned primarily above the top surface 143 of the second wing 140 and three pressure fans 192A-C are positioned primarily below the bottom surface 145 of the second wing 140.

In such embodiments where at least three fans are positioned primarily above and below a wing of the aircraft, the localized pressure of the air above and below the wing can be particularly controlled where at least one suction fan and at least one pressure fan is positioned further toward the wing root than the wing tip of the wing and at least one suction fan and at least one pressure fan is positioned further toward the wing tip than the wing root of the wing. FIG. 2 shows the first wing 130 and the second wing 140 having fans mounted along their respective spans in such an arrangement.

Advantageously, controlling the fans of the top and bottom arrays independently allows for operating the arrays differently during different flight segments to optimize the efficiency at each point. Particularly, localized control of the airspeed can be achieved with the fan configuration and control scheme of the present disclosure and thus the pressure above and below the wings can also be controlled. This allows the wings to function as high-lift wings during certain flight segments, e.g., takeoff, climb, descent, and approach and landing, and as efficient, low drag wings during other flight segments, e.g., during cruise. Moreover, traditional high-lift devices such as slats and flaps can be eliminated and/or made less complex and heavy as the camber of the wings need not be changed to the same extend with the fan configuration and control scheme of the present disclosure. Furthermore, as will be explained below, the electric machines associated with the pressure fans can be operated in a generator mode as the pressure fans use ram air to rotate. This causes the electric machines to generate electrical power for use in battery charging and/or elsewhere.

Figure 6:
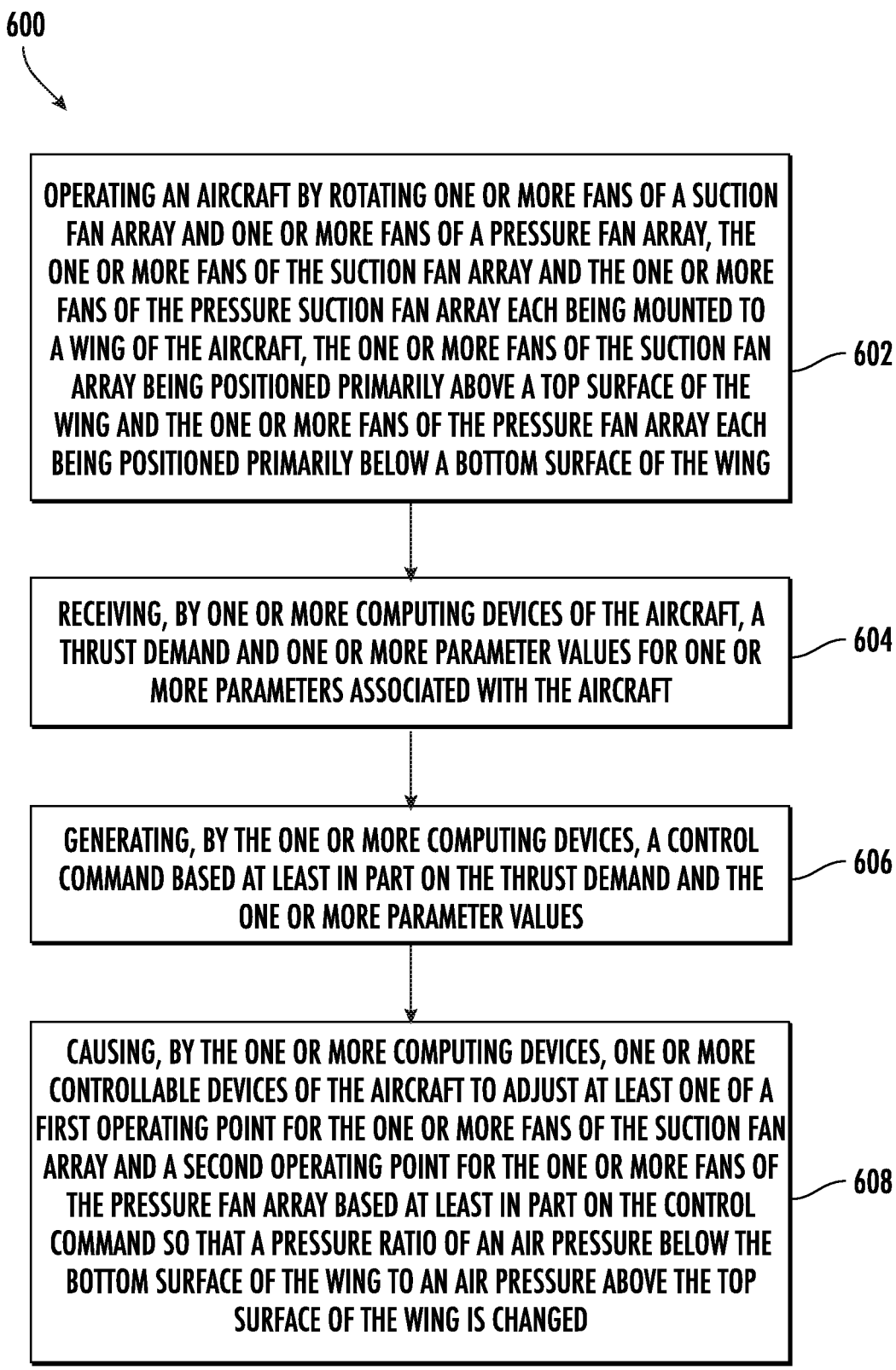
FIG. 6 provides a flow diagram for a method of operating an aircraft according to an example aspect of the present disclosure.

FIG. 6 provides a flow diagram for a method (600) of operating an aircraft according to an example aspect of the present disclosure. Any suitable type of aircraft can be operated in accordance with method (600). For instance, the aircraft can have any of the aircraft configurations noted herein. In this regard, aircraft having a tube and wing configuration, aircraft having a blended wing configuration, aircraft having a flying wing configuration, as well as other aircraft having other configurations can be operated in accordance with method (600).

At (602), the method (600) includes operating an aircraft by rotating one or more fans of a suction fan array and one or more fans of a pressure fan array, the one or more fans of the suction fan array and the one or more fans of the pressure fan array each being mounted to a wing of the aircraft, the one or more fans of the suction fan array being positioned primarily above a top surface of the wing and the one or more fans of the pressure fan array each being positioned primarily below a bottom surface of the wing. For instance, the aircraft can be the aircraft 100 of FIG. 1. As depicted, the one or more fans 162A, 162B, 162C of the first suction fan array 160 are rotated above their respective axes of rotation and one or more fans 172A, 172B, 172C of the first pressure fan array 170 are rotated above their respective axes of rotation. The fans 162A-C and 172A-C can be driven about their respective axes of rotation by one or more fan drive units 166A-C and 176A-C, e.g., electric machines operable in a drive mode. The fans 162A, 162B, 162C of the first suction fan array 160 are positioned primarily above the top surface 133 of the first wing 130 and the fans 172A, 172B, 172C of the first pressure fan array 170 are positioned primarily below the bottom surface 135 of the first wing 130.

At (604), the method (600) includes receiving, by one or more computing devices of the aircraft, a thrust demand and one or more parameter values for one or more parameters associated with the aircraft. For instance, as shown in FIG. 5, the aircraft can include a computing system 320 having one or more memory devices 322 and one or more processors 324. At least some of the one or more memory devices 322 and one or more processors 324 can be embodied in one or more computing devices. As shown, the one or more processors 324 receive the thrust demand 340 and the data 350, which can include sensed and/or calculated values for various parameters associated with the aircraft. In some implementations, the one or more parameters include at least one of an altitude, a change in altitude, an attitude of the aircraft, an ambient pressure, and an airspeed. In addition, in such implementations, the one or more parameters can include at least one of an electric current at one or more of power converters associated with the fan drive units that are in turn associated with the fans, an electric current at one or more of the fan drive units, a voltage at one or more of the power converters and/or one or more of the fan drive units, a shaft speed of one or more of the fan drive units, a fan speed of one or more of the fans, etc.

At (606), the method (600) includes generating, by the one or more computing devices, a control command based at least in part on the thrust demand and the one or more parameter values. For instance, the one or more processors 324 can generate a control command 370 based on the thrust demand 340 and the data 350. The one or more processors 324 can determine a control command that will optimize the lift on the wings, e.g., based on the altitude, attitude of the aircraft, ambient pressure, airspeed, etc. and the received thrust demand 340. The one or more processors 324 can generate the control command or commands and the command(s) can be routed to the controllable device(s) 330 that can ultimately adjust the operating point of the fan arrays 160, 170, and in some instances, the fan arrays 180, 190.

At (608), the method (600) includes causing, by the one or more computing devices, one or more controllable devices of the aircraft to adjust at least one of a first operating point for the one or more fans of the suction fan array and a second operating point for the one or more fans of the pressure fan array based at least in part on the control command so that a pressure ratio of an air pressure below the bottom surface of the wing to an air pressure above the top surface of the wing is changed. For instance, with reference to FIG. 5, the controllable devices 330 can control the electrical power provided to their respective fan drive units 166A-C, 176A-C. This controls the mechanical power output by the dan drive units 166A-C, 176A-C and ultimately the operating point or fan speed of the fans 162A, 162B, 162C of the first suction fan array 160 and the fans 172A, 172B, 172C of the first pressure fan array 170. The fans 162A, 162B, 162C of the first suction fan array 160 can all be controlled to the same operating point, i.e., first operating point, and the fans 172A, 172B, 172C of the first pressure fan array 170 can all be controlled to the same operating point, i.e., the second operating point. The second operating point can be different than the first operating point, or in some instances, the first and second operating points can be the same. Thus, the fan arrays 160, 170 are controllable independent of one another. When the controllable devices 330 are caused to be adjusted, the first operating point for the one or more fans 162A, 162B, 162C of the first suction fan array 160 and/or the second operating point for the one or more fans 172A, 172B, 172C of the first pressure fan array 170 is/are adjusted such that the pressure ratio of an air pressure below the bottom surface 135 of the first wing 130 to an air pressure above the top surface 133 of the first wing 130 is changed. This effectively changes the lift on the first wing 130.

In some implementations, to change the lift characteristics of the wing, in causing the one or more controllable devices to adjust at least one of the first operating set point and the second operating set point based at least in part on the control command, the first operating point is adjusted such that a velocity of an airflow streamline above the top surface of the wing is increased and the second operating point is adjusted such that a velocity of an airflow streamline below the bottom surface of the wing is decreased so that the pressure ratio is increased. This may increase the lift on the wing. In other implementations, the lift characteristics of on the wing can be adjusted in any of the example manners noted herein.

It will be appreciated that other sets of fans arranged and distributed along other wings of the aircraft, e.g., the second set 154, can be controlled in any of the manners noted herein in accordance with method (600).

Figure 7:
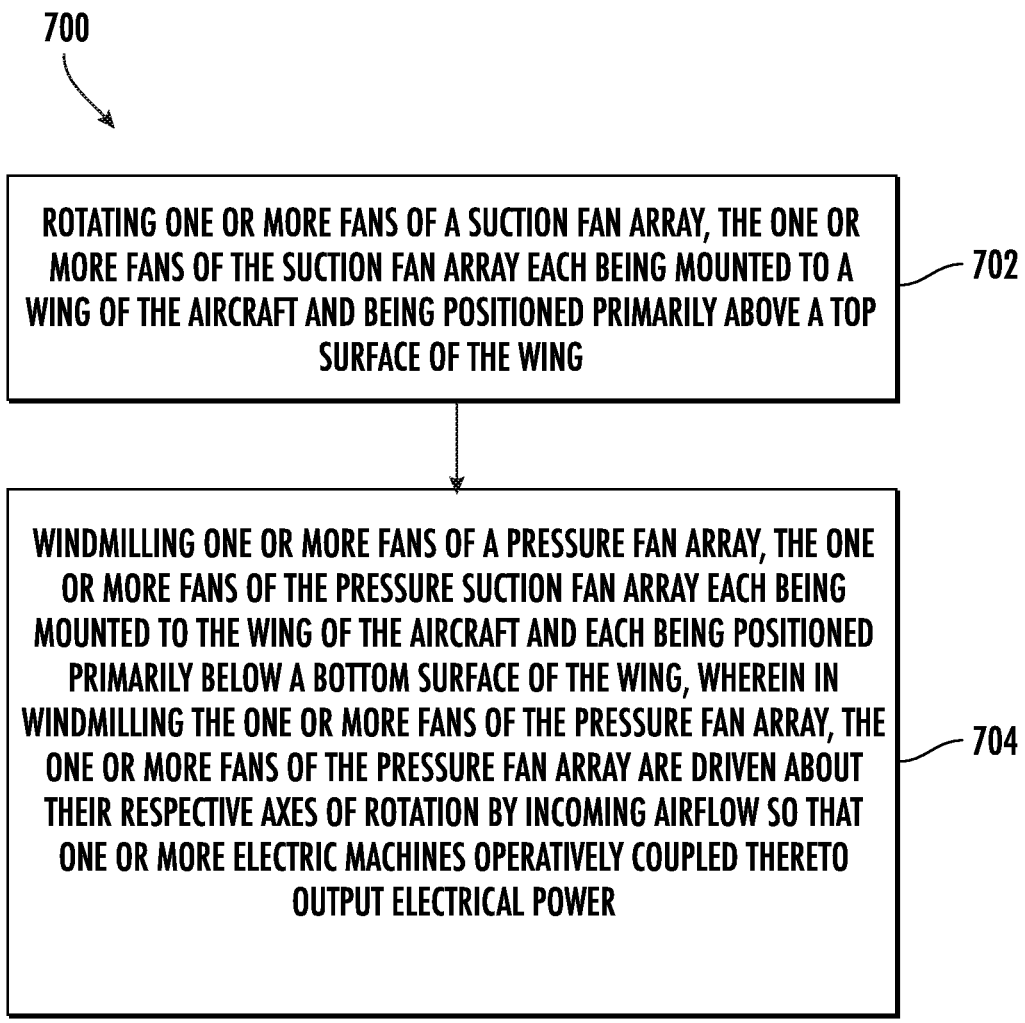
FIG. 7 provides a flow diagram for another method of operating an aircraft according to an example aspect of the present disclosure.

FIG. 7 provides a flow diagram for a method (700) of operating an aircraft according to an example aspect of the present disclosure. Any suitable type of aircraft can be operated in accordance with method (700). For instance, the aircraft can have any of the aircraft configurations noted herein. In this regard, aircraft having a tube and wing configuration, aircraft having a blended wing configuration, aircraft having a flying wing configuration, as well as other aircraft having other configurations can be operated in accordance with method (700).

At (702), the method (700) includes rotating one or more fans of a suction fan array, the one or more fans of the suction fan array each being mounted to a wing of the aircraft and being positioned primarily above a top surface of the wing. For instance, the aircraft can be the aircraft 100 of FIG. 1. As depicted, the fans 162A, 162B, 162C of the first suction fan array 160 are mounted to the first wing 130 of the aircraft 100 and are positioned primarily above the top surface 133 of the first wing 130. The fans 162A, 162B, 162C of the first suction fan array 160 can be rotated by one or more fan drive units. The fan drive units can be electrical machines operable in a drive mode for driving the fans 162A, 162B, 162C about their respective axes of rotation.

At (704), the method (700) includes windmilling one or more fans of a pressure fan array, the one or more fans of the pressure fan array each being mounted to the wing of the aircraft and each being positioned primarily below a bottom surface of the wing, wherein in windmilling the one or more fans of the pressure fan array, the one or more fans of the pressure fan array are driven about their respective axes of rotation by incoming airflow so that one or more electric machines operatively coupled thereto output electrical power. For instance, as depicted in FIGS. 1 and 2, the aircraft 100 includes one or more fans 172A, 172B, 172C of a pressure fan array 170. The fans 172A, 172B, 172C of the pressure fan array 170 are mounted to the first wing 130 of the aircraft 100 offset from the fans 162A, 162B, 162C along the lateral direction L2 and are positioned primarily below the bottom surface 135 of the first wing 130.

As noted, the one or more fans 172A, 172B, 172C of the pressure fan array 170 can be windmilled, or stated differently, allowed to rotate passively without being actively driven by one or more fan drive units of the aircraft 100. That is, the one or more fans 172A, 172B, 172C of the pressure fan array 170 are rotated about their respective axes of rotation by air flowing through their fan blades 174A, 174B, 174C rather than by the by one or more fan drive units of the aircraft 100. When the fans 172A, 172B, 172C of the pressure fan array 170 are windmilled or driven about their respective axes of rotation by incoming airflow, the one or more electric machines operatively coupled with the fans 172A, 172B, 172C of the pressure fan array 170 can output electrical power. This can produce drag on the aircraft, which helps the aircraft slowdown. This may useful during approach and landing segments of flight.

Figure 8:
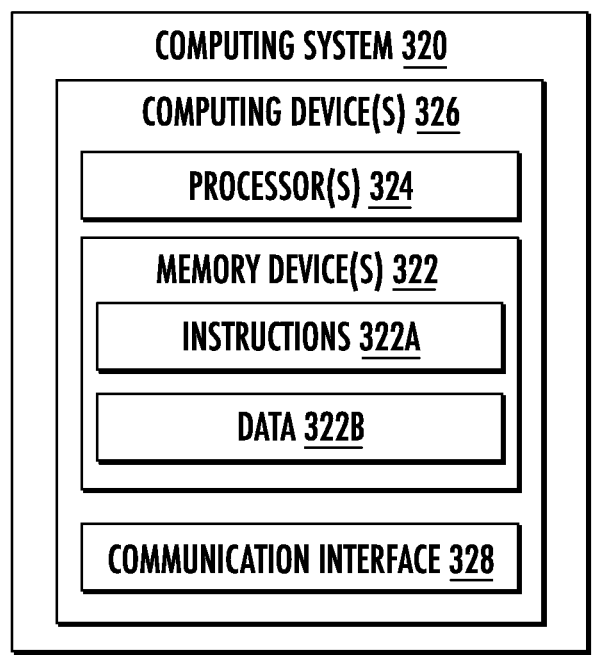
FIG. 8 provides a block diagram of the computing system of the control system of FIG. 5.

FIG. 8 provides a block diagram of the computing system 320 according to example embodiments of the present subject matter. The computing system 320 is one example of a suitable computing system for implementing the computing elements described herein.

As shown in FIG. 8, the computing system 320 can include one or more processor(s) 324 and one or more memory device(s) 322 as noted above. The one or more processor(s) 324 and one or more memory device(s) 322 can be embodied in one or more computing device(s) 326. The one or more processor(s) 324 can include any suitable processing device, such as a microprocessor, microcontroller, integrated circuit, logic device, or other suitable processing device. The one or more memory device(s) 322 can include one or more computer-readable medium, including, but not limited to, non-transitory computer-readable medium or media, RAM, ROM, hard drives, flash drives, and other memory devices, such as one or more buffer devices.

The one or more memory device(s) 322 can store information accessible by the one or more processor(s) 324, including computer-readable instructions 322A that can be executed by the one or more processor(s) 324. The instructions 322A can be any set of instructions that, when executed by the one or more processor(s) 324, cause the one or more processor(s) 324 to perform operations. The instructions 322A can be software written in any suitable programming language or can be implemented in hardware. The instructions 322A can be any of the computer-readable instructions noted herein.

The memory device(s) 322 can further store data 322B that can be accessed by the processor(s) 324. For example, the data 322B can include received data 350 (FIG. 5). Further, the data 322B can include one or more table(s), function(s), algorithm(s), model(s), equation(s), etc. according to example embodiments of the present disclosure.

The one or more computing device(s) 326 can also include a communication interface 328 used to communicate, for example, with other components of the control system 300 or other systems or devices. The communication interface 328 can include any suitable components for interfacing with one or more network(s), including for example, transmitters, receivers, ports, controllers, antennas, or other suitable components.

The technology discussed herein makes reference to computer-based systems and actions taken by and information sent to and from computer-based systems. It will be appreciated that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

1. An aircraft, comprising: a wing having a top surface and a bottom surface; a suction fan array having one or more fans mounted to the wing, the one or more fans each being positioned primarily above the top surface of the wing; and a pressure fan array having one or more fans mounted to the wing, the one or more fans of the pressure fan array each being positioned primarily below the bottom surface of the wing; wherein the one or more fans of the suction fan array are controllable independent of the one or more fans of the pressure fan array.

2. The aircraft of any preceding clause, wherein the one or more fans of the suction fan array are controllable to a first operating point and the one or more fans of the pressure fan array are controllable to a second operating point, and wherein the aircraft further comprises: one or more controllable devices; one or more sensors; a computing system having one or more memory devices and one or more processors, the one or more processors being configured to: generate a control command based at least in part on a thrust demand and one or more parameter values for one or more parameters associated with the aircraft, the control command indicating instructions for adjusting at least one of the first operating point and the second operating point; and cause the one or more controllable devices to adjust at least one of the first operating point and the second operating point based at least in part on the control command.

3. The aircraft of any preceding clause, wherein the one or more parameters include at least one of an altitude, a change in altitude, an attitude of the aircraft, an ambient pressure, and an airspeed.

4. The aircraft of any preceding clause, wherein in causing the one or more controllable devices to adjust at least one of the first operating set point and the second operating set point based at least in part on the control command, at least one of the first operating point and the second operating point is adjusted such that a pressure ratio of an air pressure below the wing to an air pressure above the top surface is changed.

5. The aircraft of any preceding clause, wherein in causing the one or more controllable devices to adjust at least one of the first operating set point and the second operating set point based at least in part on the control command, at least one of the first operating point and the second operating point is adjusted such that the pressure ratio is increased so that lift on the wing is increased.

6. The aircraft of any preceding clause, wherein in causing the one or more controllable devices to adjust at least one of the first operating set point and the second operating set point based at least in part on the control command, the first operating point is adjusted such that a velocity of an airflow streamline above the top surface of the wing is increased so that the pressure ratio is increased.

7. The aircraft of any preceding clause, wherein in causing the one or more controllable devices to adjust at least one of the first operating set point and the second operating set point based at least in part on the control command, the second operating point is adjusted such that a velocity of an airflow streamline below the bottom surface of the wing is decreased so that the pressure ratio is increased.

8. The aircraft of any preceding clause, wherein in causing the one or more controllable devices to adjust at least one of the first operating set point and the second operating set point based at least in part on the control command, at least one of the first operating point and the second operating point is adjusted such that the pressure ratio is decreased so that lift on the wing is decreased.

9. The aircraft of any preceding clause, wherein the wing is a first wing, and wherein the aircraft further comprises: a fuselage, the first wing extending outward from the fuselage; a second wing extending outward from the fuselage opposite the first wing, the second wing having a top surface and a bottom surface; a second suction fan array having one or more fans mounted to the second wing, the one or more fans of the second suction fan array each being positioned primarily above the top surface of the second wing; and a second pressure fan array having one or more fans mounted to the second wing, the one or more fans of the second pressure fan array each being positioned primarily below the bottom surface of the second wing, and wherein the one or more fans of the second suction fan array are controllable to a third operating point and the one or more fans of the second pressure fan array are controllable to a fourth operating point that is different than the third operating point.

10. The aircraft of any preceding clause, wherein the third operating point is a same operating point as the first operating point and the fourth operating point is a same operating point as the second operating point.

11. The aircraft of any preceding clause, wherein the one or more fans of the suction fan array and the one or more fans of the pressure fan array each have fan blades that are rotatable aft of a trailing edge of the wing.

12. The aircraft of any preceding clause, wherein the one or more fans of the suction fan array and the one or more fans of the pressure fan array each have fan blades that are rotatable forward of a leading edge of the wing.

13. The aircraft of any preceding clause, wherein the one or more fans of the suction fan array include at least three fans and the one or more fans of the pressure fan array include at least three fans.

14. The aircraft of any preceding clause, wherein the one or more fans of the suction fan array and the one or more fans of the pressure fan array each have an associated fan drive unit, the fan drive units being electric machines operable in a drive mode in which a given one of the one or more fans is driven by the electric machine associated therewith and a generator mode in which a given electric machine generates electrical power when the fan associated therewith is rotated.

15. The aircraft of any preceding clause, wherein at least one of the one or more fans of the suction fan array and at least one of the one or more fans of the pressure fan array is positioned further toward a wing root than a wing tip of the wing and at least one of the one or more fans of the suction fan array and at least one of the one or more fans of the pressure fan array is positioned further toward the wing tip than the wing root of the wing.

16. A method, comprising: operating an aircraft by rotating one or more fans of a suction fan array and one or more fans of a pressure fan array, the one or more fans of the suction fan array and the one or more fans of the pressure fan array each being mounted to a wing of the aircraft, the one or more fans of the suction fan array being positioned primarily above a top surface of the wing and the one or more fans of the pressure fan array each being positioned primarily below a bottom surface of the wing; receiving, by one or more computing devices of the aircraft, a thrust demand and one or more parameter values for one or more parameters associated with the aircraft; generating, by the one or more computing devices, a control command based at least in part on the thrust demand and the one or more parameter values; and causing, by the one or more computing devices, one or more controllable devices of the aircraft to adjust at least one of a first operating point for the one or more fans of the suction fan array and a second operating point for the one or more fans of the pressure fan array based at least in part on the control command so that a pressure ratio of an air pressure below the bottom surface of the wing to an air pressure above the top surface of the wing is changed.

17. The method of any preceding clause, wherein the one or more parameters include at least one of an altitude, a change in altitude, an attitude of the aircraft, an ambient pressure, and an airspeed.

18. The method of any preceding clause, wherein the second operating point is different than the first operating point.

19. The method of any preceding clause, wherein in causing the one or more controllable devices to adjust at least one of the first operating set point and the second operating set point based at least in part on the control command, the first operating point is adjusted such that a velocity of an airflow streamline above the top surface of the wing is increased and the second operating point is adjusted such that a velocity of an airflow streamline below the bottom surface of the wing is decreased so that the pressure ratio is increased.

20. A method of operating an aircraft, comprising: rotating one or more fans of a suction fan array, the one or more fans of the suction fan array each being mounted to a wing of the aircraft and being positioned primarily above a top surface of the wing; and windmilling one or more fans of a pressure fan array, the one or more fans of the pressure fan array each being mounted to the wing of the aircraft and each being positioned primarily below a bottom surface of the wing, wherein in windmilling the one or more fans of the pressure fan array, the one or more fans of the pressure fan array are driven about their respective axes of rotation by incoming airflow so that one or more electric machines operatively coupled thereto output electrical power.

What is claimed is:

1. A method of operating an aircraft, comprising:
actively rotating one or more fans of a suction fan array with one or more fan drive units, the one or more fans of the suction fan array each being mounted to a wing of the aircraft and being positioned primarily above a top surface of the wing; and
windmilling one or more fans of a pressure fan array, simultaneously with the active rotation of the one or more fans of the suction fan array, to slowdown the aircraft, the one or more fans of the pressure fan array each being mounted to the wing of the aircraft and each being positioned primarily below a bottom surface of the wing, wherein in windmilling the one or more fans of the pressure fan array, the one or more fans of the pressure fan array are driven about their respective axes of rotation by incoming airflow so that one or more electric machines operatively coupled thereto output electrical power.

2. The method of claim 1, further comprising:
operating the aircraft by rotating the one or more fans of the suction fan array and the one or more fans of the pressure fan array, wherein the one or more fans of the suction fan array are controllable to a first fan speed and the one or more fans of the pressure fan array are controllable to a second fan speed.

3. The method of claim 2, further comprising:
receiving, by one or more computing devices of the aircraft, a thrust demand and one or more parameter values for one or more parameters associated with the aircraft;
determining a flight segment of a flight of the aircraft based at least in part on the one or more parameter values;
generating, by the one or more computing devices, a control command based at least in part on the thrust demand and the flight segment in which the aircraft is operating, the control command indicating instructions for adjusting at least one of the first fan speed and the second fan speed to optimize a lift on the wing for the flight segment; and
causing, by the one or more computing devices, one or more controllable devices of the aircraft to adjust at least one of a first operating point for the one or more fans of the suction fan array and a second operating point for the one or more fans of the pressure fan array based at least in part on the control command so that a pressure ratio of an air pressure below the bottom surface of the wing to an air pressure above the top surface of the wing is changed to optimize the lift.

4. The method of claim 3, wherein i) when the flight segment is a cruise flight segment, the one or more controllable devices are caused to adjust at least one of the first fan speed and the second fan speed based at least in part on the control command so as to increase a pressure locally above the wing and/or to decrease the pressure locally below the wing to control the lift on the wings in the cruise flight segment; and ii) when the flight is one of a takeoff, climb, descent, or approach flight segment, the one or more controllable devices are caused to adjust at least one of the first fan speed and the second fan speed based at least in part on the control command so as to decrease the pressure locally above the wing and/or to increase the pressure locally below the wing to control the lift on the wing in one of the takeoff, climb, descent, or approach flight segment.

5. The method of claim 3, wherein the one or more parameters include at least one of an altitude, a change in altitude, an attitude of the aircraft, an ambient pressure, and an airspeed.

6. The method of claim 2, wherein the second fan speed is different than the first fan speed.

7. The method of claim 3, wherein in causing the one or more controllable devices to adjust at least one of first fan speed and the second fan speed based at least in part on the control command, the first fan speed is adjusted such that a velocity of an airflow streamline above the top surface of the wing is increased and the second fan speed is adjusted such that a velocity of an airflow streamline below the bottom surface of the wing is decreased so that the pressure ratio is increased.

8. An aircraft, comprising:
a wing having a top surface and a bottom surface;
a suction fan array having one or more fans mounted to the wing, the one or more fans each being positioned primarily above the top surface of the wing;
a pressure fan array having one or more fans mounted to the wing, the one or more fans of the pressure fan array each being positioned primarily below the bottom surface of the wing, wherein the one or more fans of the suction fan array are controllable independent of the one or more fans of the pressure fan array;
one or more controllable devices; and
a computing system having one or more memory devices and one or more processors, the one or more processors being configured to:
  actively rotate the one or more fans of the suction fan array with one or more fan drive units; and
  windmill the one or more fans of the pressure fan array, simultaneously with the active rotation of the one or more fans of the suction fan array, to slowdown the aircraft, wherein in windmilling the one or more fans of the pressure fan array, the one or more fans of the pressure fan array are driven about their respective axes of rotation by incoming airflow so that one or more electric machines operatively coupled thereto output electrical power.

9. The aircraft of claim 8, wherein the one or more processors are further configured to:
generate a control command based at least in part on a thrust demand and a flight segment in which the aircraft is operating, the thrust demand being a request for a specific thrust output of a distributed propulsion system of the aircraft that includes the fans of the suction and pressure fan arrays, and the control command indicating instructions for adjusting at least one of a first fan speed and a second fan speed to optimize a lift on the wing for the flight segment; and
cause the one or more controllable devices to adjust at least one of the first fan speed and the second fan speed based at least in part on the control command such that a pressure ratio of an air pressure below the wing to an air pressure above the top surface is changed to optimize the lift.

10. The aircraft of claim 9, wherein the one or more processors being configured to:
determine the flight segment in which the aircraft is operating based at least in part on at least one of an altitude, a change in altitude, an attitude of the aircraft, and an airspeed.

11. The aircraft of claim 9, wherein in causing the one or more controllable devices to adjust at least one of the first fan speed and the second fan speed based at least in part on the control command, at least one of the first fan speed and the second fan speed is adjusted such that the pressure ratio is increased so that the lift on the wing is increased.

12. The aircraft of claim 9, wherein in causing the one or more controllable devices to adjust at least one of the first fan speed and the second fan speed based at least in part on the control command, the first fan speed is adjusted such that a velocity of an airflow streamline above the top surface of the wing is increased so that the pressure ratio is increased.

13. The aircraft of claim 9, wherein in causing the one or more controllable devices to adjust at least one of the first fan speed and the second fan speed based at least in part on the control command, the second fan speed is adjusted such that a velocity of an airflow streamline below the bottom surface of the wing is decreased so that the pressure ratio is increased.

14. The aircraft of claim 9, wherein in causing the one or more controllable devices to adjust at least one of the first fan speed and the second fan speed based at least in part on the control command, at least one of the first fan speed and the second fan speed is adjusted such that the pressure ratio is decreased so that the lift on the wing is decreased.

15. The aircraft of claim 8, wherein the wing is a first wing, and wherein the aircraft further comprises:
a fuselage, the first wing extending outward from the fuselage;
a second wing extending outward from the fuselage opposite the first wing, the second wing having a top surface and a bottom surface;
a second suction fan array having one or more fans mounted to the second wing, the one or more fans of the second suction fan array each being positioned primarily above the top surface of the second wing; and
a second pressure fan array having one or more fans mounted to the second wing, the one or more fans of the second pressure fan array each being positioned primarily below the bottom surface of the second wing, and
wherein the one or more fans of the second suction fan array are controllable to a first operating point and the one or more fans of the second pressure fan array are controllable to a second operating point that is different than the first operating point.

* * * * *